US011586518B2

(12) United States Patent
Sloat

(10) Patent No.: US 11,586,518 B2
(45) Date of Patent: Feb. 21, 2023

(54) THERMAL EVENT PREDICTION IN HYBRID MEMORY MODULES

(71) Applicant: Micron Technology, Inc., Boise, ID (US)

(72) Inventor: Jacob Sloat, Bloomington, MN (US)

(73) Assignee: Micron Technology, Inc., Boise, ID (US)

( * ) Notice: Subject to any disclaimer, the term of this patent is extended or adjusted under 35 U.S.C. 154(b) by 44 days.

(21) Appl. No.: 17/005,302

(22) Filed: Aug. 27, 2020

(65) Prior Publication Data
US 2022/0066899 A1 Mar. 3, 2022

(51) Int. Cl.
G06F 12/00 (2006.01)
G06F 11/30 (2006.01)
G06F 11/07 (2006.01)
G06F 3/06 (2006.01)

(52) U.S. Cl.
CPC ........ *G06F 11/3037* (2013.01); *G06F 3/0619* (2013.01); *G06F 3/0659* (2013.01); *G06F 3/0679* (2013.01); *G06F 11/076* (2013.01); *G06F 11/0772* (2013.01); *G06F 11/3058* (2013.01)

(58) Field of Classification Search
None
See application file for complete search history.

(56) References Cited

U.S. PATENT DOCUMENTS

2017/0038805 A1* 2/2017 Chun ................. G06F 3/0604
2019/0012263 A1* 1/2019 Jenne ................. G06F 3/0619

* cited by examiner

*Primary Examiner* — Daniel D Tsui
(74) *Attorney, Agent, or Firm* — Dorsey & Whitney LLP

(57) ABSTRACT

A controller of a non-volatile, dual, in-line memory modules (NVDIMM). A NVDIMM is configured to predict thermal events associated with save and restore operations prior to starting the save or restore operation. The controller of the NVDIMM includes a thermal event prediction circuit to predict whether a thermal event will occur in response to a request to perform a save or restore operation, and to cause the controller to perform an action in response to a determination that a thermal event is likely to occur. To predict the thermal event, the controller may be configured to predict a peak temperature of the save or restore operation based on a predicted temperature increase from an initial or starting temperature. The predicted temperature increase may be based on a rate of temperature change during the save or restore operation and a duration of the save or restore operation.

19 Claims, 5 Drawing Sheets

THERMAL EVENT PREDICTION IN HYBRID MEMORY MODULES

DESCRIPTION OF RELATED ART

A hybrid memory module is a memory module that includes volatile memory (e.g., dynamic random access memory (DRAM)) and non-volatile memory (e.g., flash memory). In some examples, a hybrid memory module may function as a standard volatile memory module during normal operation, with a capability to transfer data from the volatile memory to the non-volatile memory for persistent storage, such as in response to a power failure, and then restore the data back to the volatile memory after recovery. The power consumed during save and restore operations may cause an increase in temperature on the hybrid memory module. When the temperature on the hybrid memory module reaches an operational the hybrid memory module may abort the save or restore operation prior to completion to avoid damaging components on the hybrid memory module, which may result in incomplete data used for operation.

DETAILED DESCRIPTION

Figure 1:
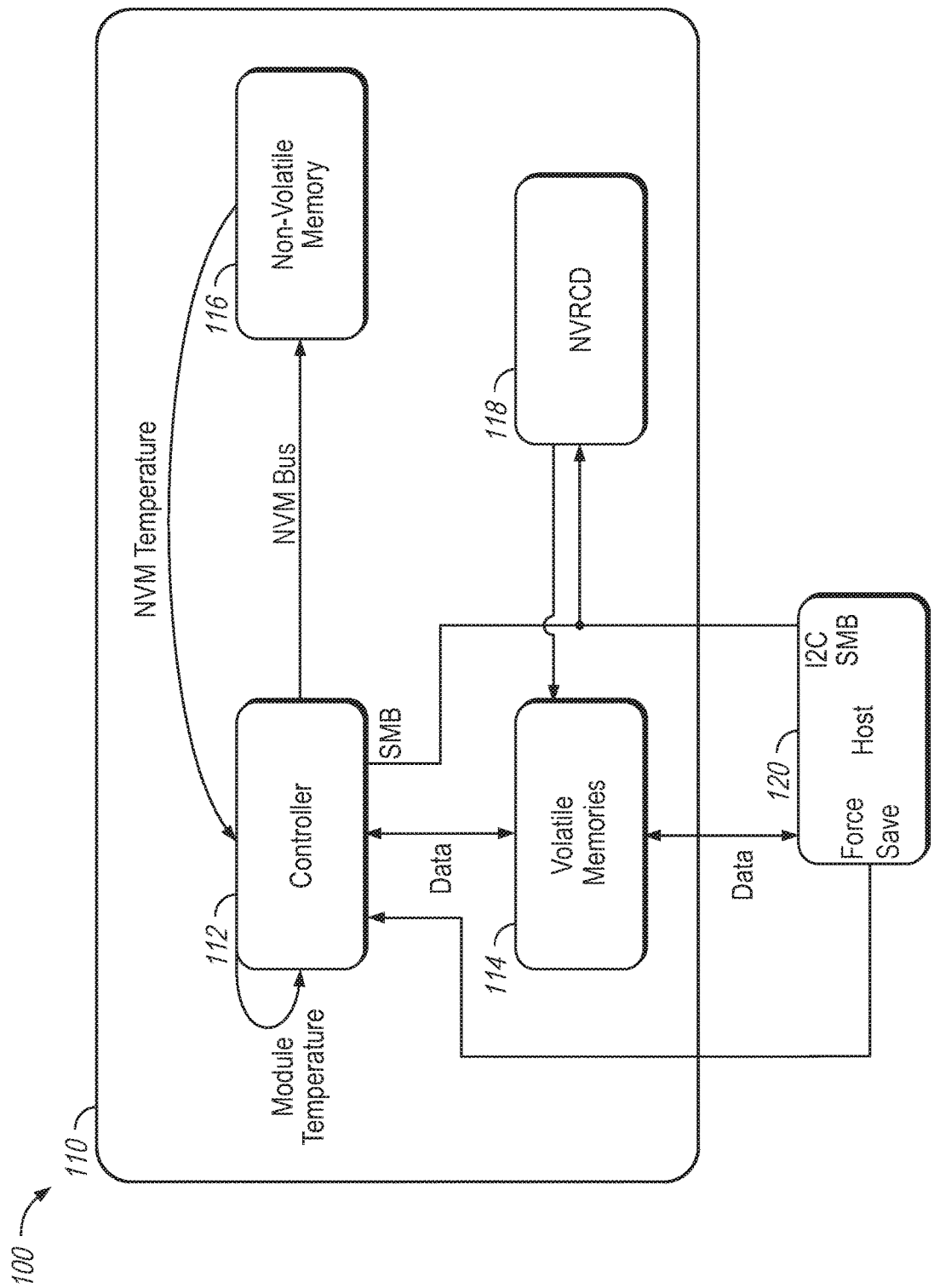
FIG. 1 is a particular illustrative embodiment of a memory system in accordance with an embodiment of the present disclosure.

This disclosure describes examples of controllers to predict thermal events in hybrid or non-volatile, dual, in-line memory modules (NVDIMM). A NVDIMM may include both volatile memories (e.g., dynamic, random-access memory DRAM) and non-volatile memories (e.g., flash). NVDIMMs may primarily operate in two modes of operation to perform memory transactions. In the first mode of operation, the NVDIMM may perform memory transactions between the volatile memory and a host (e.g., a memory controller, processor unit, etc.) In a second mode of operation, the NVDIMM may perform memory transactions between the volatile memory and the non-volatile memory (e.g., save and restore transactions) via an onboard controller (e.g., control circuit). During the second mode of operation, the transfer of data may include a high speed transfer, which may result in increased power consumption for a period of time to complete the transfer. Due to the increased power consumption, the temperature on the NVDIMM may increase during the transfer. If the temperature exceeds a maximum specified operating temperature, the controller of the NVDIMM may detect a thermal event and abort the transfer to prevent damage to components on the NVDIMM. Having to abort the save or restore operation may disrupt operation of the NVDIMM and/or the system in which it is installed.

The likelihood of a thermal event may be affected by an initial temperature at the start of the save or restore operation (e.g., based on previous operations performed on the NVDIMM), thermal properties of the components of the NVDIMM, thermal properties of the installed environment (e.g., airflow, location relative to other heat-producing components, etc.), quantity of data to be transferred, time required to complete the transfer, or combinations thereof. In some examples, for an NVDIMM, the rate of increase of the temperature during a save or restore event may be consistent from one save event to the next.

The controller of the NVDIMM may include a thermal event prediction circuit (e.g., or device, module, etc.) that is configured to predict whether a thermal event will occur in response to a request to perform a save or restore operation (e.g., a data transfer operation), and to cause the controller to perform an action in response to a determination that a thermal event is likely to occur. To predict the thermal event, the controller may be configured to predict a peak temperature of the save or restore operation based on a predicted temperature increase from an initial or starting temperature. The predicted temperature increase may be based on a rate of temperature change during the save or restore operation and a duration of the save or restore operation. The duration of the save or restore operation may be based on an amount of data to transfer and the data throughput of the relevant buses. The action performed by the controller may be based on a current rate of temperature change and/or thermal recovery rate as the temperature cools after performing a save or restore operation.

The initial temperature and the current rate (e.g., ramp or slope of temperature change divided by time) of temperature change may be based on real-time temperature measurements from a temperature sensor on the NVDIMM. The current rate of temperature change may be determined based on a rate of change of the temperature between two successive temperature measurements.

The predicted temperature increase and the predicted recovery rate of temperature change may be determined during a calibration operation. During the calibration operation, the controller may measure a starting or idle temperature (e.g., temperature sensor of the controller and/or temperature provided received a temperature sensor of the non-volatile memory), perform a save or restore operation, determine the peak (e.g., maximum) temperature achieved, measure the time to the peak temperature and the time to recover to the initial temperature.

The predicted temperature increase may be based on the measured rate of temperature change and a time to complete the save or restore operation. The measured rate of temperature change may be based on a difference between the starting temperature and the peak temperature divided by the time from the start of the operation to the time the peak temperature was reached. The predicted recovery time may be based on the peak temperature and the predicted recovery rate of temperature change. The predicted recovery rate of temperature change may be determined based on a difference between the peak temperature and the starting temperature divided by a duration from the time the peak temperature is reached to the time at which the temperature recovers to the starting temperature.

The calibration operation may be performed during a boot operation of the NVDIMM. In an example, the calibration operation may be performed during production, and the predicted temperature increase and the predicted recovery rate may be stored on the NVDIMM. In other examples, the calibration operation may be performed in an installed system, and the predicted rate and the predicted recovery rate of temperature change may be stored on the NVDIMM. Additionally or alternatively, the calibration operation may be performed in response to certain events (e.g., boot or reboot, restart, etc.). Additionally or alternatively, the controller may be configured to periodically measure the temperature increase and the recovery rate in real-time as save and restore operations are performed and may update one or both of the predicted temperature increase or the predicted recovery rate of temperature change, such as replacing the store values with new values, replace the stored values with an average of the stored values and the new values, etc. In some examples, the controller may be configured to store predicted temperature increase and predicted recovery rates for different types of save and/or restore operations, such as a full save or restore operation, one or more partial save or restore operations, etc.

The actions performed by the controller in response to a determination that a thermal event is likely to occur may include remaining idle for a time period (e.g., idle period) before starting the save or restore operation to allow a current temperature to decrease, canceling the save or restore operation, providing a warning or alert (e.g., generating a warning or error in an error log of the NVDIMM), or any combination thereof. The total length of the idle period of the save or restore operation may be based on a current temperature, the expected temperature increase, and the predicted recovery rate of temperature change. In some examples, the idle period may be bound by a specified time delay limit (e.g., based on a maximum amount of time the save or restore operation has complete). If the controller predicts that the idle period length may exceed the specified delay limit, the controller may perform another action, such as cancel the save or restore operation, proceeding with the save or restore operation, providing a warning or alert, or any combination thereof. After starting the idle period, a predicted end to the idle period may be based on the current temperature, the current rate of temperature change, the predicted temperature increase, and the maximum specified operating temperature.

In some examples, the thermal even prediction circuit may be selectively enabled or disabled. Implementing the thermal prediction circuit in the controller of the NVDIMM may allow the NVDIMM to avoid at least some thermal events, which may increase operation reliability of the NVDIMM.

FIG. 1 is a particular illustrative embodiment of a memory system 100 in accordance with an embodiment of the present disclosure. The memory system 100 may include a non-volatile, dual-inline memory module (NVDIMM) 110 coupled to a host 120. The NVDIMM 110 includes a controller (e.g., control circuit, control logic, control chip or device, control module, etc.) 112, volatile memories 114, non-volatile memories (NVMs) 116, and non-volatile register clock driver (NVRCD) 118.

The NVDIMM 110 may be configured to communicate with the host 120 via an I2C interface or a system management bus (SMB interface) (e.g., with the NVRCD 118), a data bus interface (e.g., with the volatile memories 114), and may be configured to provide a force save signal (e.g., with the controller 112) to the NVDIMM 110. The controller 112 may be configured to perform management operations on the NVDIMM 110, such as transferring data (e.g., the contents of the volatile memories 114) from the volatile memories 114 to the NVMs 116 (e.g., save operation), transferring data (e.g., the contents of the NVMs 116) from the NVMs 116 to the volatile memories 114 (e.g., restore operation), detecting power failures, detecting thermal events, predicting thermal events, changing modes of operation based on command or detected events, etc. The controller 112 may include an application-specific integrated circuit (ASIC), a field-programmable gate array (FPGA), or other integrated circuitry. The controller 112 may perform error calculations and/or checking functions during the transfer of data between the volatile memories 114 and the NVMs 116.

The volatile memories 114 may include any type of volatile memory, for example, any double data rate (DDR) synchronous DRAM (SDRAM) architecture (e.g., DDR SDRAM, DDR2 SDRAM, DDR3 SDRAM, DDR4 SDRAM, DDR5 SDRAM, LPDDR4 DRAM, etc.). The volatile memories 114 may be coupled to the controller 112 and to the host 120 via a data bus. In some examples, the volatile memories 114 may be configured to provide data to and receive data from the host 120 over the data bus while in a first mode of operation and may be configured to provide data to and receive data from the controller 112 over the data bus while in a second mode of operation. In some examples, the volatile memories 114 may use the same input/output (IO) terminals and buffers of the volatile memories 114 for data bus communication with either of the host 120 and the controller 112. For example, the NVDIMM 110 and/or the volatile memories 114 may include multiplexers (not shown) to selectively enable one of data communication between the host 120 and the volatile memories 114 or data communication between the controller 112 and the volatile memories 114. In other examples, the volatile memories 114 may use a first set of IO terminals and buffers for data bus communication between the controller 112 and the volatile memories 114 and may use a second set of IO terminals and buffers for data bus communication between the controller 112 and the host 120. In some examples, the volatile memories 114 may each include a respective mode register that is configured to store operating parameters, such as a mode of operation.

The controller 112 may be coupled to NVMs 116 via an NVM bus to transfer commands, addresses, and data between the controller 112 and the NVMs 116. The NVMs 116 may include one or more non-volatile memories, for example, flash memory. The NVMs 116 may include any type of non-volatile memory. For example, the NVMs 116 may include flash memory, such as NAND flash memory and NOR flash memory.

The controller 112 may be further configured to provide command and address information over the SMB to the NVRCD 118. The NVRCD 118 may further be configured to receive command and address data from the host 120 via the I2C or SMB. In some examples, the NVRCD 118 may be configured to receive command and address information from the host 120 while in a first mode of operation and may be configured to receive command and address information from the controller 112 while in a second mode of operation. In some examples, the NVDIMM 110 may include multiplexers (not shown) to selectively enable one of I2C or SMB communication between the host 120 and the NVRCD 118 or SMB communication between the controller 112 and the NVRCD 118. The NVRCD 118 may provide command and address signals to the volatile memories 114 to cause the volatile memories 114 to perform memory access operations.

In operation, the volatile memories 114 may selectively communicate with the host 120 or the controller 112 to perform memory access transactions. For example, during a first mode of operation (e.g., normal operation), the NVRCD 118 may be configured to provide command and address signals from the host 120 based on command and address data received via the I2C or SMB and the volatile memories 114 may be configured to receive data from and provide data to the host 120 via the data bus. Communication between the volatile memories 114 and the controller 112 may be disabled during the first mode of operation.

During a second mode of operation (e.g., save/restore operation), the NVRCD 118 may be configured to provide command and address signals to the volatile memories 114 based on command and address data received from the controller 112 via the SMB and the volatile memories 114 may be configured to receive data from and provide data to the controller 112 via the data bus. During the second mode of operation, the data received at and provided from the volatile memories 114 may be provided from the NVMs 116 (e.g., restore operation) and received at the NVMs 116 (e.g., save operation), respectively.

Transition to a second mode of operation may be initiated by the host 120, in some examples. For example, the host 120 may send a force save command to the controller 112 to instruct the controller 112 to transition to the second mode. In other examples, the controller 112 may initiate the transition to the second mode in response to detection of an event, such as a power failure event, a boot event, etc. In the second mode of operation, the host 120 may relinquish control of the volatile memories 114 to the controller 112. The controller 112 may set the volatile memories 114 to the second mode of operation by sending mode register commands and information to the volatile memories 114 to program the mode registers with information to set the second mode of operation.

During the second mode of operation, the controller 112 may control save and restore operations between the volatile memories 114 and the NVMs 116. During a save operation, the controller 112 may facilitate transfer of some or all of the data stored at the volatile memories 114 to the NVMs 116 for persistent storage. For example, the data of the volatile memories 114 may be stored at the NVMs 116 in response to a power failure event. During a restore operation, the controller 112 may facilitate transfer some or all of the data stored at the NVMs 116 to the volatile memories 114. For example, the data of the NVMs 116 may be transferred to the volatile memories 114 in response to recovery from a power failure event, such as after a boot.

During a save or restore operation, the circuitry of the NVDIMM 110 may consume a significant amount of power for the period of time it takes to transfer the data between the volatile memories 114 and the NVMs 116, which may cause the temperature on the NVDIMM 110 to increase during the transfer. If the temperature exceeds a maximum specified operating temperature, the controller 112 may detect a thermal event and abort the transfer to prevent damage to components on the NVDIMM 110. Having to abort the save or restore operation may disrupt operation of the NVDIMM 110 and/or the memory system 100.

The likelihood of a thermal event may be affected by an initial temperature (e.g., based on previous operations performed on the NVDIMM 110), thermal properties of the components of the NVDIMM 110, thermal properties of the installed environment (e.g., airflow, location relative to other heat-producing components, etc.), quantity of data to be transferred, time for transfer, or combinations thereof. In some examples, for the NVDIMM 110, the experienced temperature increase during a save or restore event may be relatively consistent between similar save events.

Thus, to prevent a thermal event, the controller 112 may include a thermal event prediction circuit (e.g., or device, module, etc.) that is configured to predict whether a thermal event is likely to occur prior to starting a save or restore operation, and to cause the controller 112 to perform an action in response to predicting a thermal event is likely to occur. To predict the thermal event, the controller 112 may be configured to predict a peak temperature based on a predicted temperature increase from a starting temperature. The predicted peak temperature may be based on a predicted rate of temperature increase and a duration of the save or restore event. The duration of the save or restore event may be based on an amount of data to transfer and the data throughput of the relevant buses. The action performed by the controller 112 may be based on a current rate of temperature change and/or thermal recovery rate as the temperature cools after performing a save or restore operation.

The initial temperature and the current rate of temperature change may be based on real-time readings from a temperature sensor (not shown) on the NVDIMM 110 (e.g., a temperature sensor of the NVMs 116 and/or a temperature sensor of the controller 112). The current rate of temperature change may be determined based on a temperature change between two successive temperature readings.

The predicted temperature increase and the predicted recovery rate of temperature change may be determined during a calibration operation. During the calibration operation, the controller 112 may measure a starting or idle temperature, perform a save or restore operation, determine the peak (e.g., maximum) temperature achieved, measure the time to the peak temperature and the time to recover to the initial temperature.

The predicted temperature increase may be based on the measured rate of temperature change and a time to complete the save or restore operation. The measured rate of temperature change may be based on a difference between the starting temperature and the peak temperature divided by the time to perform the save or restore operation. The predicted recovery time may be based on the peak temperature and the predicted recovery rate of temperature change. The predicted recovery rate of temperature change may be determined based on a difference between the peak temperature and the starting temperature divided by a duration from the time the peak temperature is reached to the time at which the temperature recovers to the starting temperature.

The calibration operation may be performed by the controller 112 during a boot operation of the NVDIMM 110. In an example, the controller 112 may be configured to perform the calibration operation during production, and the predicted temperature increase and the predicted recovery rate may be stored on the NVDIMM 110. In other examples, the controller 112 may be configured to perform the calibration operation in an installed system, and the predicted temperature increase and the predicted recovery rate of temperature change may be stored on the NVDIMM 110. Additionally or alternatively, the controller 112 may be configured to perform the calibration operation in response to certain events (e.g., boot or reboot, restart, etc.) to determine the predicted temperature increase and the predicted recovery rate of temperature change. Additionally or alternatively, the controller 112 may be configured to periodically measure the predicted temperature increase and the predicted recovery rate of temperature change in real-time. In response to detection of a change in one or both of the predicted temperature increase or the predicted recovery rate of temperature change, the controller 112 may replace one or both of the predicted temperature increase or the recovery rate of temperature change with updated values, replace the predicted temperature increase and/or the predicted temperature increase with a value based on an average the stored values and the updated values. In some examples, the controller 112 may be configured to store predicted temperature increase and predicted recovery rates for different types of save and/or restore operations, such a full save or restore operation, one or more partial save or restore operations, etc.

The actions performed by the controller 112 may include remaining idle for a time period (e.g., idle period) before initiating the save or restore operation to delay a start of the save or restore operation, canceling the save or restore operation, providing a warning or alert (e.g., creating an entry in a log indicating the predicted thermal event), or any combination thereof. The total length of the idle period of the save or restore operation may be based on a current temperature, the expected temperature increase, and the predicted recovery rate of temperature change. In some examples, the idle period may be bound by a specified time delay limit (e.g., based on a maximum amount of time the save or restore operation has complete). In response to a prediction that the idle period length may exceed the specified delay limit, the controller 112 may perform another action, such as cancel the save or restore operation, proceeding with the save or restore operation, providing a warning or alert, or any combination thereof. After starting, a predicted end to the idle period may be based on the current temperature, the current rate of temperature change, the predicted temperature increase, and the maximum specified operating temperature.

In other examples, rather than issuing a force save command, the host 120 may directly initiate both save and restore operations via respective commands. For examples, the host 120 may provide a first command (e.g., a save command) to the controller 112 via the SMB to cause the controller 112 to transfer the contents of the volatile memories 114 to the NVMs 116, and may provide a second command (e.g., a restore command) to the controller 112 via the SMB to cause the controller 112 to transfer the contents of the NVMs 116 to the volatile memories 114. In response to receipt of the first command for the save operation or the second command for the restore operation, determining, via logic of the NVDIMM 110 (e.g., logic circuitry of the controller 112), whether a temperature on the NVDIMM during the save operation or the restore operation will exceed a threshold value associated with an operating temperature of the NVDIMM. The controller 112 may determine whether to perform the save operation or the restore operation or take another action (e.g., delay performing the save operation or the restore operation, canceling the save operation or the restore operation, etc.) based at least in part on the determination.

In some examples, the thermal even prediction circuit may be selectively enabled or disabled based on a configuration setting. Implementing the thermal prediction circuit in the controller 112 may allow the NVDIMM 110 to avoid at least some thermal events, which may increase operation reliability of the NVDIMM 110. While the thermal event prediction is described with reference to save and restore operations, the thermal event prediction circuitry may be used to predict thermal events for other operations.

Figure 2:
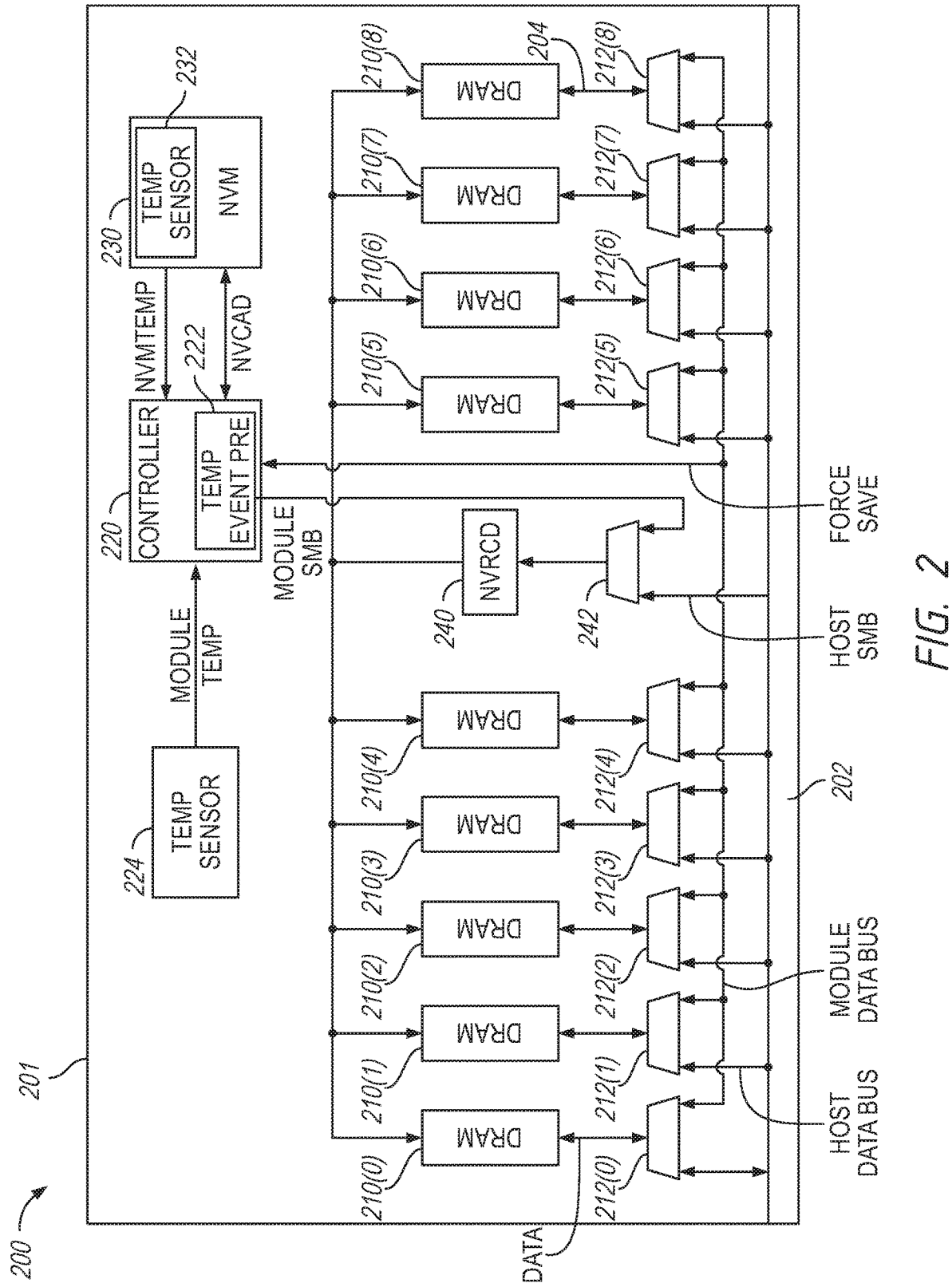
FIG. 2 is a schematic block diagram of a non-volatile dual in-line memory module (NVDIMM) in accordance with an embodiment of the present disclosure.

FIG. 2 is a schematic block diagram of a non-volatile dual in-line memory module (NVDIMM) 200 in accordance with an embodiment of the present disclosure. As shown, the NVDIMM 200 may include a printed circuit board 201 configured to host both DRAM memories 210(0)-(8) and a NVM 230, as well as a controller 220. The NVDIMM 110 of FIG. 1 may implement the NVDIMM 200 in some examples.

The NVDIMM 200 may be configured to communicate with a host via a system management bus (SM 13 interface) (e.g., with the NVRCD 240 via a 242), a data bus interface (e.g., with the DRAM memories 210(0)-(8)), and a force save signal (e.g., with the controller 220). The controller 220 may be configured to perform management operations on the NVDIMM 200, such as transferring data from the DRAM memories 210(0)-(8) to the NVM 230 (e.g., save operation), transferring data from the NVM 230 to the DRAM memories 210(0)-(8) (e.g., restore operation), detecting power failure, detecting thermal events, predicting thermal events, changing modes of operation based on command or detected events, etc. The controller 220 may include an application-specific integrated circuit (ASIC), a field-programmable gate array (FPGA), or other integrated circuitry. The controller 220 may perform error calculations and/or checking functions during the transfer of data between the DRAM memories 210(0)-(8) and the NVM 230.

The DRAM memories 210(0)-(8) may include any type of volatile memory, for example, any double data rate (DDR) synchronous DRAM (SDRAM) architecture (e.g., DDR SDRAM, DDR2 SDRAM, DDR3 SDRAM, DDR4 SDRAM, DDR5 SDRAM, LPDDR4 DRAM, etc.). The DRAM memories 210(0)-(8) may be coupled to the controller 220 via a module data bus and to the host via a host bus coupled to an edge connector 202 of the printed circuit board 201. In some examples, the DRAM memories 210(0)-(8) may be configured to provide data to and receive data from the host over the host data bus while in a first mode of operation and may be configured to provide data to and receive data from the controller 220 over the module data bus while in a second mode of operation. The DRAM memories 210(0)-(8) may be configured to use the same IO terminals and buffers for host data bus communication and module data bus communication. The NVDIMM 200 (e.g., or the DRAM memories 210(0)-(8)) may include multiplexers 212(0)-(8) to selectively enable one of data communication with the host or module data buses. In some examples, the DRAM memories 210(0)-(8) may each include a respective mode register that is configured to store operating parameters, such as a mode of operation. In some examples, one of the DRAM memories 210(0)-(8) may be configured to store error correcting code (ECC) data to facilitate ECC operations on the data stored at the other memories of the DRAM memories 210(0)-(8).

The controller 220 may be coupled to NVM 230 via an NVM bus to transfer commands, addresses, and data between the controller 220 and the NVM 230. The NVM 230 may include one or more non-volatile memories, for example, flash memory. The NVM 230 may include any type of non-volatile memory. For example, the NVM 230 may include flash memory, such as NAND flash memory and NOR flash memory.

The controller 220 may be further configured to provide command and address information over the SMB to the NVRCD 240 via the multiplexers 242. The NVRCD 240 may further be configured to receive command and address data from the host via a SMB bus and the multiplexers 242. In some examples, the NVRCD 240 may be configured to receive command and address information from the host while in a first mode of operation and may be configured to receive command and address information from the controller 220 while in a second mode of operation. In some examples, the multiplexers 242 may be configured to selectively couple the NVRCD 240 to one of the host SMB or the module SMB based on a mode of operation. The NVRCD 240 may provide command and address signals to the DRAM memories 210(0)-(8) in response to the command and address information from the host to cause the DRAM memories 210(0)-(8) to perform memory access operations.

In operation, the DRAM memories 210(0)-(8) may selectively communicate with the host via the NVRCD 240 and the host data bus or with the controller 220 via the module data bus and the NVRCD 240 based on a mode of operation. In an example, during a first mode of operation (e.g., normal operation), the NVRCD 240 may be configured to provide command and address signals to the DRAM memories 210(0)-(8) based on command and address data received from the host via the host SMB and the multiplexers 242, and the DRAM memories 210(0)-(8) may be configured to receive data from and provide data to the host via the host data bus and the multiplexers 212(0)-(8). Communication between the DRAM memories 210(0)-(8) and the controller 220 may be disabled during the first mode of operation.

During a second mode of operation (e.g., save/restore operation), the NVRCD 240 may be configured to provide command and address signals to the DRAM memories 210(0)-(8) in response to command and address data received from the controller 220 via the module SMB and the 242, and the DRAM memories 210(0)-(8) may be configured to receive data from and provide data to the controller 220 via the module data bus and the multiplexers 212(0)-(8).

In some examples, transition to the second mode of operation may be initiated by the host. For example, the host may send a force save command to the controller 220 to instruct the controller 220 to transition to the second mode. In other examples, the controller 220 may cause the transition to the second mode in response to detection of an event, such as a power failure event, a boot event, etc. In the second mode, the host relinquishes control of the DRAM memories 210(0)-(8) to the controller 220. The controller 220 may set the DRAM memories 210(0)-(8) to the second mode of operation by sending mode register commands and information to the DRAM memories 210(0)-(8) to program the mode registers with information to set the second mode of operation.

During the second mode of operation, the controller 220 may control save and restore operations. During a save operation, the controller 220 may transfer some or all of the data stored at the DRAM memories 210(0)-(8) to the NVM 230 for persistent storage. For example, the data of the DRAM memories 210(0)-(8) may be stored at the NVM 230 in response to a power failure event. During a restore operation, the controller 220 may transfer some or all of the data stored at the NVM 230 to the DRAM memories 210(0)-(8). For example, the data of the NVM 230 may be stored at the DRAM memories 210(0)-(8) in response to recovery from a power failure event, such as after a boot.

During a save or restore operation, the circuitry of the NVDIMM 200 may consume a significant amount of power for the period of time it takes to transfer the data between the DRAM memories 210(0)-(8) and the NVM 230. The increase in power consumption may cause the temperature on the NVDIMM 200 to increase during the operation. If the temperature exceeds a maximum specified operating temperature, the controller 220 may detect a thermal event and abort the transfer to prevent damage to components on the NVDIMM 200. Having to abort the save or restore operation may disrupt operation of the NVDIMM 200 and/or the NVDIMM 200.

The likelihood of a thermal event may be affected by an initial temperature of the NVDIMM 200 (e.g., based on preceding operations performed on the NVDIMM 200), thermal properties of the components of the NVDIMM 200, thermal properties of the installed environment (e.g., airflow, location relative to other heat-producing components, etc.), capacity of data to be transferred, time for transfer, or combinations thereof. In some examples, for the NVDIMM 200, the rate of increase of the temperature during a save or restore event may be consistent from one save event to the next.

Thus, to prevent a thermal event, the controller 220 may include a temperature sensor 222 (e.g., or device, module, etc.) that is configured to predict whether a thermal event is likely to occur prior to starting a save or restore operation, and to cause the controller 220 to perform an action in response to predicting a thermal event is likely to occur. To predict the thermal event, the temperature sensor 222 may be configured to predict a peak temperature based on a predicted temperature increase from a starting temperature. The predicted temperature increase may be based on a rate of temperature increase during the save or restore operation and a duration of the save or restore operation. The duration of the save or restore operation may be based on an amount of data to transfer and the data throughput of the relevant buses. The action performed by the controller 220 may be based on a current rate of temperature change and/or thermal recovery rate as the temperature cools after performing a save or restore operation.

The initial temperature and the current rate of temperature change may be based on real-time readings from the 224 (e.g., or from the temperature sensor 232) (e.g., the current rate may be determined by based on a temperature difference between two successive temperature measurements). The predicted rate of temperature change and the predicted recovery rate of temperature change may be determined during a calibration operation. During the calibration operation, the temperature sensor 222 may measure a starting or idle temperature (e.g., via the 224 and/or the temperature sensor 232), perform a save or restore operation, determine the peak (e.g., maximum) temperature achieved, measure the time to the peak temperature and the time to recover to the initial temperature.

The measured rate of temperature change may be based on a difference between the starting temperature and the peak temperature divided by the time from the start of the operation to the time the peak temperature was reached. The predicted recovery time may be based on the peak temperature and the predicted recovery rate of temperature change. The predicted recovery rate of temperature change may be determined based on a difference between the peak temperature and the starting temperature divided by a duration from the time the peak temperature is reached to the time at which the temperature recovers to the starting temperature.

The calibration operation may be performed by the temperature sensor 222 during a boot operation on the NVDIMM 200. In an example, the temperature sensor 222 may be configured to perform the calibration operation during production, and the predicted temperature increase and the predicted recovery rate may be stored on the temperature sensor 222. In other examples, the temperature sensor 222 may be configured to perform the calibration operation in an installed system, and the predicted temperature increase and the predicted recovery rate of temperature change may be stored on the NVDIMM 200. Additionally or alternatively, the controller 220 may be configured to perform the calibration operation in response to certain events (e.g., boot or reboot, restart, etc.). Additionally or alternatively, the temperature sensor 222 may be configured to periodically measure the temperature increase and the recovery rate in real-time during save and restore operations and may replace one or both of the stored values of predicted temperature increase or the recovery rate of temperature change, replace the stored values with an average of the stored values and the new values, or any combination thereof. In some examples, the temperature sensor 222 may be configured to store the predicted temperature increase and the recovery rate for different types of save and/or restore operations, such a full save or restore operation, one or more partial save or restore operations, etc.

The actions performed by the temperature sensor 222 and/or the controller 220 may include remaining idle for a time period (e.g., idle period) before starting the save or restore operation to allow a current temperature to decrease, canceling the save or restore operation, providing a warning or alert (e.g., save alert or warning to an operating or error log), or any combination thereof. The total length of the idle period prior to the save or restore operation may be based on a current temperature, the expected temperature increase, and the predicted recovery rate of temperature change. In some examples, the idle period may be bound by a specified time limit (e.g., based on a maximum amount of time the save or restore operation has complete). In response to a prediction that the idle period length may exceed the specified delay limit, the controller 220 may perform another action, such as cancel the save or restore operation, proceed with the save or restore operation, provide a warning or alert, or any combination thereof. After starting the idle period, a predicted end to the idle period may be based on the current temperature, the current rate of temperature change, the predicted temperature increase, and the maximum specified operating temperature.

In some examples, the thermal even prediction circuit may be selectively enabled or disabled based on a configuration setting. Implementing the thermal prediction circuit in the temperature sensor 222 may allow the NVDIMM 200 to avoid at least some thermal events, which may increase operation reliability of the NVDIMM 200. While the thermal event prediction is described with reference to save and restore operations, the thermal event prediction circuitry may be used to predict thermal events for other operations.

Figure 3:
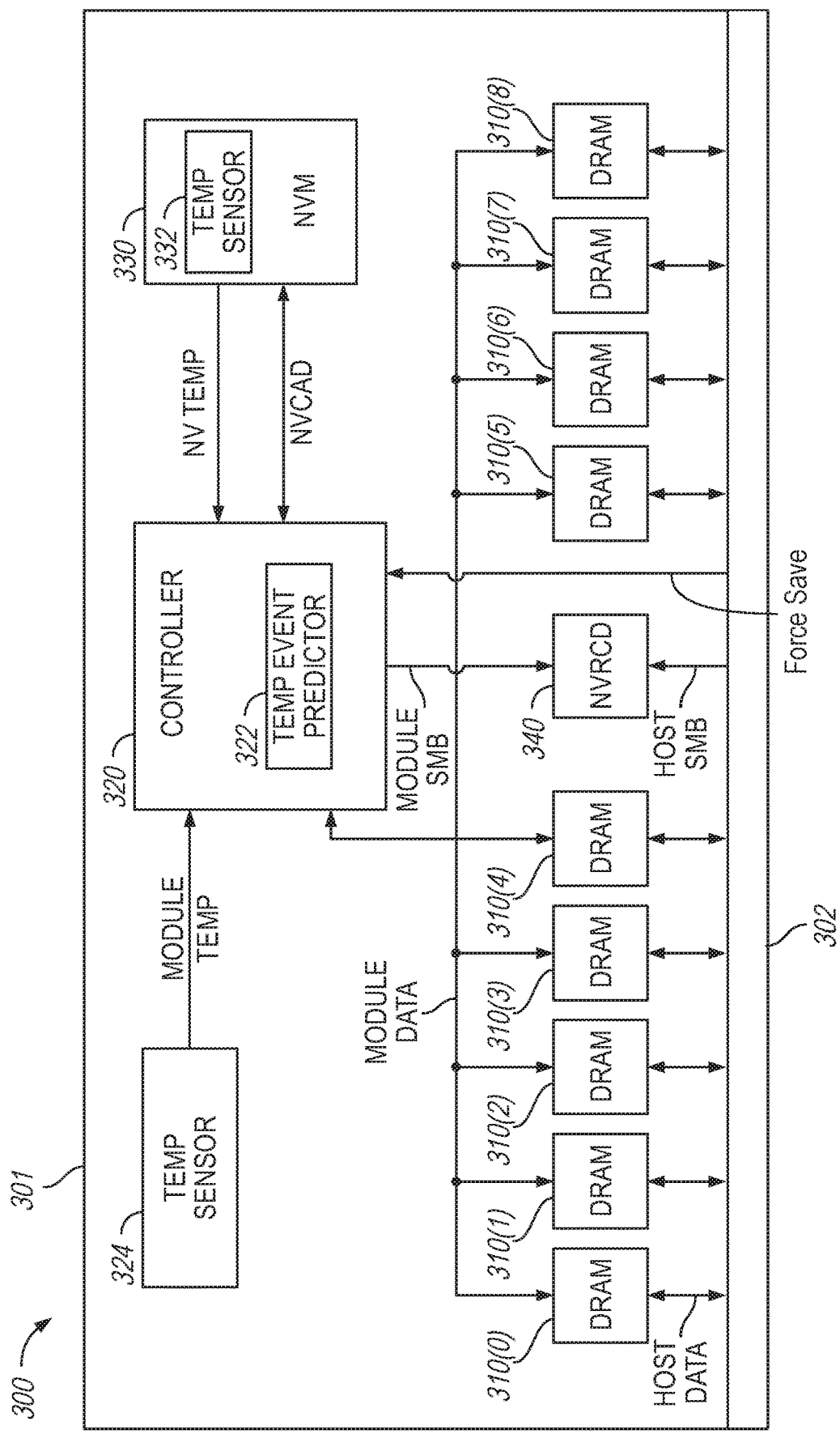
FIG. 3 is a schematic block diagram of a non-volatile dual in-line memory module (NVDIMM) in accordance with an embodiment of the present disclosure.

FIG. 3 is a schematic block diagram of a non-volatile dual in-line memory module (NVDIMM) 300 in accordance with an embodiment of the present disclosure. As shown, the NVDIMM 300 may include a printed circuit board 301 configured to host both DRAM memories 310(0)-(8) and a NVM 330, as well as a controller 320. The NVDIMM 110 of FIG. 1 may implement the NVDIMM 300 in some examples.

The NVDIMM 300 may be configured to communicate with a host via a system management bus (SMB interface) (e.g., with the NVRCD 340 via a multiplexer (not shown)), a data bus interface (e.g., with the DRAM memories 310(0)-(8)), and may be configured to provide a force save signal to the controller 320. The controller 320 may be configured to perform management operations on the NVDIMM 300, such as transferring data from the DRAM memories 310(0)-(8) to the NVM 330 (e.g., save operation), transferring data from the NVM 330 to the DRAM memories 310(0)-(8) (e.g., restore operation), detecting power failure, detecting thermal events, predicting thermal events, changing modes of operation based on command or detected events, etc. The controller 320 may include an application-specific integrated circuit (ASIC), a field-programmable gate array (FPGA), or other integrated circuitry. The controller 320 may perform error calculations and/or checking functions during the transfer of data between the DRAM memories 310(0)-(8) and the NVM 330.

The DRAM memories 310(0)-(8) may include any type of volatile memory, for example, any double data rate (DDR) synchronous DRAM (SDRAM) architecture (e.g., DDR SDRAM, DDR2 SDRAM, DDR3 SDRAM, DDR4 SDRAM, DDR5 SDRAM, LPDDR4 DRAM, etc.). The DRAM memories 310(0)-(8) may be coupled to the controller 320 via a module data bus and to the host via a host data bus via an edge connector 302 of the printed circuit board 301. In some examples, the DRAM memories 310(0)-(8) may be configured to provide data to and receive data from the host over the host data bus while in a first mode of operation and may be configured to provide data to and receive data from the controller 320 over the module data bus while in a second mode of operation. The data bus communication between the controller 320 and the DRAM memories 310(0)-(8) may use a first set of IO terminals and buffers of the DRAM memories 310(0)-(8) and the data bus communication between the host and the DRAM memories 310(0)-(8) may use a second set of IO terminals and buffers of the DRAM memories 310(0)-(8). The NVDIMM 300 (e.g., or the DRAM memories 310(0)-(8)) may include 312(0)-(8) to selectively enable one of data communication with the host or module data buses. In some examples, the DRAM memories 310(0)-(8) may each include a respective mode register that is configured to store operating parameters, such as a mode of operation and IO terminals and buffers used for each mode. In some examples, one of the DRAM memories 310(0)-(8) may be configured to store error correcting code (ECC) data to facilitate ECC operations on the data stored at the other memories of the DRAM memories 310(0)-(8).

The controller 320 may be coupled to NVM 330 via an NVM bus to transfer commands, addresses, and data between the controller 320 and the NVM 330. The NVM 330 may include one or more non-volatile memories, for example, flash memory. The NVM 330 may include any type of non-volatile memory. For example, the NVM 330 may include flash memory, such as NAND flash memory and NOR flash memory.

The controller 320 may be further configured to provide command and address information over the SMB to the NVRCD 340 via the multiplexer (not shown). The NVRCD 340 may further be configured to receive command and address data from the host via a host SMB bus. In some examples, the NVRCD 340 may be configured to receive command and address information from the host while in a first mode of operation and may be configured to receive command and address information from the controller 320 while in a second mode of operation. In some examples, a multiplexer may be configured to selectively couple the NVRCD 340 to one of the host SMB or the module SMB based on a mode of operation. The NVRCD 340 may provide command and address signals to the DRAM memories 310(0)-(8) in response to the command and address information from the host to cause the DRAM memories 310(0)-(8) to perform memory access operations.

In operation, the DRAM memories 310(0)-(8) may selectively communicate with the host via the edge connector 302 and the host data bus or the controller 320 via the module data bus and the NVRCD 340 based on a mode of operation.

In an example, during a first mode of operation (e.g., normal operation), the NVRCD 340 may be configured to provide command and address signals to the DRAM memories 310(0)-(8) based on command and address information received from the host via the host SMB, and the DRAM memories 310(0)-(8) may be configured to receive data from and provide data to the host via the host data bus at the first set of IO terminals and buffers. Communication between the DRAM memories 310(0)-(8) and the controller 320 may be disabled during the first mode of operation.

During a second mode of operation (e.g., save/restore operation), the NVRCD 340 may be configured to provide command and address signals to the DRAM memories 310(0)-(8) in response to command and address data received from the controller 320 via the module SMB, and the DRAM memories 310(0)-(8) may be configured to receive data from and provide data to the controller 320 via the module data bus at the second set of IO terminals and buffers.

In some examples, transition to a second mode of operation may be initiated by the host. For example, the host may send a force save command to the controller 320 to instruct the controller 320 to transition to the second mode. In other examples, the controller 320 may cause the transition to the second mode in response to detection of an event, such as a power failure event, a boot event, etc. In the second mode, the host relinquishes control of the DRAM memories 310(0)-(8) to the controller 320. The controller 320 may set the DRAM memories 310(0)-(8) to the second mode of operation by sending mode register commands and information to the DRAM memories 310(0)-(8) to program the mode registers with information to set the second mode of operation.

During the second mode of operation, the controller 320 may control save and restore operations. During a save operation, the controller 320 may transfer some or all of the data stored at the DRAM memories 310(0)-(8) to the NVM 330 for persistent storage. For example, the data of the DRAM memories 310(0)-(8) may be stored at the NVM 330 in response to a power failure event. During a restore operation, the controller 320 may transfer some or all of the data stored at the NVM 330 to the DRAM memories 310(0)-(8). For example, the data of the NVM 330 may be transferred to the DRAM memories 310(0)-(8) in response to recovery from a power failure event, such as after a boot.

During a save or restore operation, the circuitry of the NVDIMM 300 may consume a significant amount of power for the period of time it takes to transfer the data between the DRAM memories 310(0)-(8) and the NVM 330. The increase in power consumption by the NVDIMM 300 may cause the temperature on the NVDIMM 300 to increase during the transfer. If the temperature (e.g., based on the 324 or the temperature sensor 332) exceeds a maximum specified operating temperature, the controller 320 may detect a thermal event and abort the transfer to prevent damage to components on the NVDIMM 300. Having to abort the save or restore operation may disrupt operation of the NVDIMM 300 and/or the NVDIMM 300.

The likelihood of a thermal event may be affected by an initial or starting temperature (e.g., based on preceding operations performed on the NVDIMM 300), thermal properties of the components of the NVDIMM 300, thermal properties of the installed environment (e.g., airflow, location relative to other heat-producing components, etc.), quantity of data to be transferred, time to complete the transfer, or combinations thereof. In some examples, for the NVDIMM 300, the rate of increase of the temperature during a save or restore event may be consistent from one save event to the next.

Thus, to prevent a thermal event, the controller 320 may include a temperature sensor 322 (e.g., or device, module, etc.) that is configured to predict whether a thermal event is likely to occur prior to starting a save or restore operation, and to cause the temperature sensor 322 or the controller 320 to perform an action in response to predicting a thermal event is likely to occur. To predict the thermal event, the temperature sensor 322 may be configured to predict a peak temperature based on a predicted temperature increase from a starting temperature. The predicted temperature increase may be based on a rate of temperature increase and a time duration of the save or restore operation. The duration of the save or restore operation may be based on an amount of data to transfer and the data throughput of the relevant buses. The action performed by the controller 320 may be based on a current rate of temperature change and/or thermal recovery rate as the temperature cools after performing a save or restore operation.

The initial temperature and the current rate of temperature change may be based on real-time temperature measurements from the 324 (e.g., or from the temperature sensor 332). The current rate may be determined based on a temperature change between two successive temperature readings. The predicted temperature increase and the predicted recovery rate of temperature change may be determined during a calibration operation. During the calibration operation, the temperature sensor 322 may measure a starting or idle temperature (e.g., via the 324 or the temperature sensor 332), perform a save or restore operation, determine the peak (e.g., maximum) temperature achieved, measure the time to the peak temperature and the time to recover to the initial temperature.

The predicted temperature increase may be based on the measured rate of temperature change and a time to complete the save or restore operation. The measured rate of temperature change may be based on a difference between the starting temperature and the peak temperature divided by the time from the start of the operation to the time the peak temperature was reached or the save or restore operation is completed. The predicted recovery time may be based on the peak temperature and the predicted recovery rate of temperature change. The predicted recovery rate of temperature change may be determined based on a difference between the peak temperature and the starting temperature divided by a duration from the time the peak temperature is reached to the time at which the temperature recovers to the starting temperature.

The calibration operation may be performed by the temperature sensor 322 during a boot. In an example, the temperature sensor 322 may be configured to perform the calibration operation during production, and the predicted temperature increase and the predicted recovery rate may be stored on the temperature sensor 322. In other examples, the temperature sensor 322 may be configured to perform the calibration operation in an installed system, and the predicted temperature increase and the predicted recovery rate of temperature change may be stored on the NVDIMM 300. Additionally or alternatively, the temperature sensor 322 may be configured to perform the calibration operation in response to certain events (e.g., boot or reboot, restart, etc.). Additionally or alternatively, the temperature sensor 322 may be configured to periodically measure the temperature increase and the recovery rate in real-time during a save or restore operation, and may replace the store values of one or both of the predicted temperature increase or the recovery rate of temperature change, replace the stored values with an average of the stored values and the real-time values, or a combination thereof. In some examples, the temperature sensor 322 may be configured to store predicted temperature increase values and predicted recovery rates for different types of save and/or restore operations, such a full save or restore operation, one or more partial save or restore operations, etc.

The actions performed by the temperature sensor 322 and/or the controller 320 may include remaining idle for a time period (e.g., idle period) before starting the save or restore operation to allow a current temperature to decrease, canceling the save or restore operation, providing a warning or alert (e.g., generate a warning or alert entry in an error log of the NVDIMM 300), or any combination thereof. The total duration of the idle period of the save or restore operation may be based on a current temperature, the expected temperature increase, and the predicted recovery rate of temperature change. In some examples, the idle period may be bound by a specified time delay limit (e.g., based on a maximum amount of time the save or restore operation has complete). In response to a prediction that the idle period length may exceed the specified delay limit, the controller 320 may perform another action, such as cancel the save or restore operation, proceed with the save or restore operation, provide a warning or alert, or any combination thereof. After starting the idle period, a predicted end to the idle period may be based on the current temperature, the current rate of temperature change, the predicted temperature increase, and the maximum specified operating temperature.

In some examples, the thermal even prediction circuit may be selectively enabled or disabled based on a configuration setting. Implementing the thermal prediction circuit in the temperature sensor 322 may allow the NVDIMM 300 to avoid at least some thermal events, which may increase operation reliability of the NVDIMM 300. While the thermal event prediction is described with reference to save and restore operations, the thermal event prediction circuitry may be used to predict thermal events for other operations.

Figure 4:
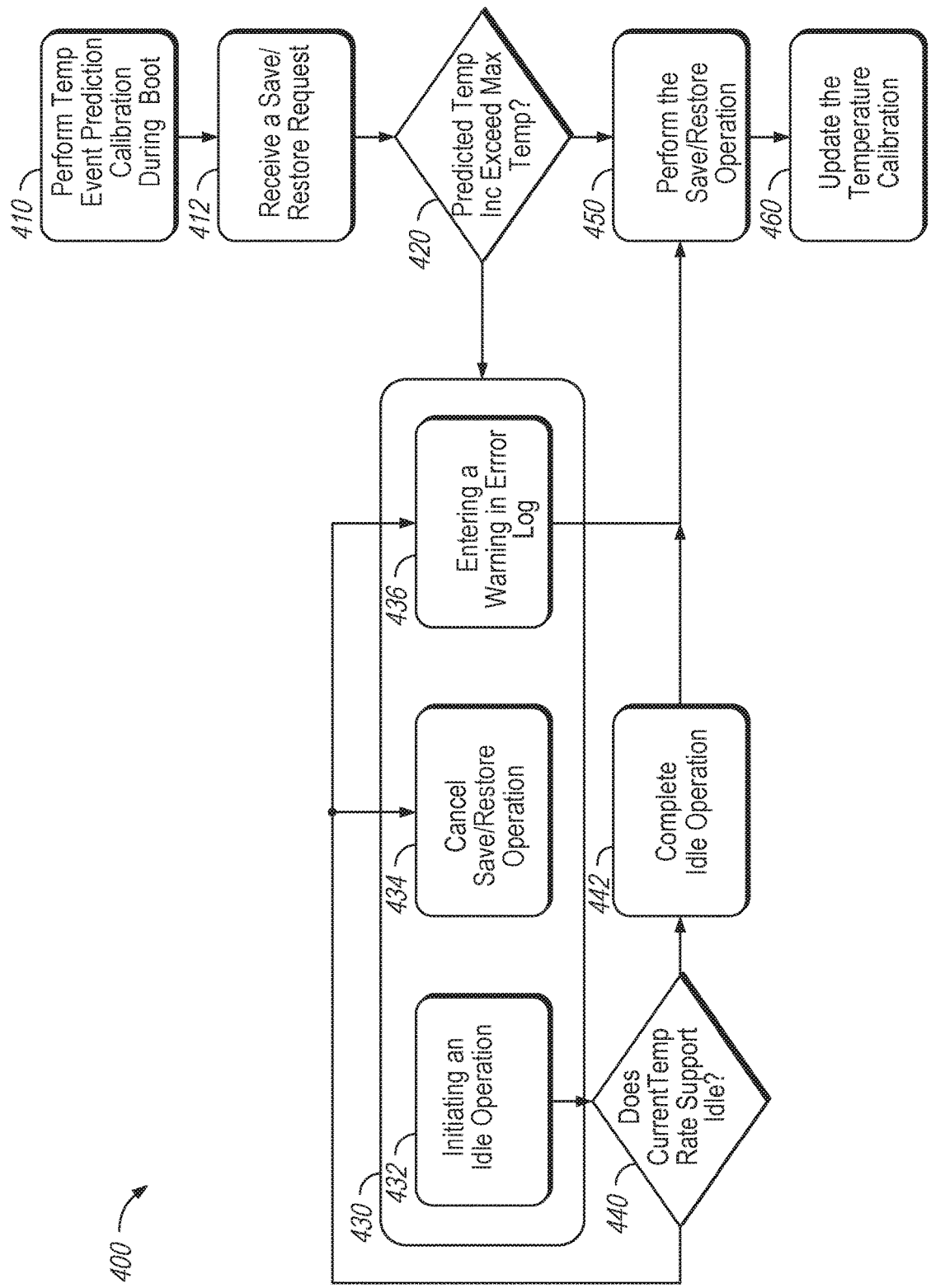
FIG. 4 includes an exemplary flowchart depicting a method for predicting a thermal event in a NVDIMM in accordance with an embodiment of the disclosure.

FIG. 4 includes an exemplary flowchart depicting a method 400 for predicting a thermal event in a NVDIMM in accordance with an embodiment of the disclosure. The method 400 may be performed by the NVDIMM 110 of FIG. 1, the temperature sensor 222 of FIG. 2, the temperature sensor 322 of FIG. 3, or a combination thereof. To predict the thermal event, a temperature event predictor may predict a peak temperature based on a predicted temperature increase from a starting temperature, and may determine whether the predicted peak temperature may exceed a maximum specified operating temperature.

The method 400 may include performing an initial temperature event prediction calibration during a boot operation, at 410. The temperature event prediction calibration may include determining a predicted temperature increase for a save or restore operation, a predicted recovery rate, or combinations thereof. The calibration operation may include measuring a starting or idle temperature via a temperature sensor (e.g., the 224 or the temperature sensor 232 of FIG. 2 and/or the 324 or the temperature sensor 332 of FIG. 3), perform a save or restore operation, determine the peak (e.g., maximum) temperature achieved, measure the time to the peak temperature and the time to recover to the initial temperature.

In an example, the temperature event prediction calibration operation may be performed during production, and/or in an installed system. Additionally or alternatively, the temperature event prediction calibration operation may be performed in response to certain events (e.g., boot or reboot, restart, etc.). After the initial temperature event prediction calibration operation, the values for one of more of the predicted temperature increase and the recovery rate may be updated based on periodic measurements of temperature increases and recovery rates measured during save and restore operations. In some examples, different predicted temperature increases and recovery rates may be stored for different types of save and/or restore operations, such a full save or restore operation, one or more partial save or restore operations, etc.

The predicted temperature increase may be based on the measured rate of temperature change and a time to complete the save or restore operation. The measured rate of temperature change may be based on a difference between the starting temperature and the peak temperature divided by the time from the start of the operation to the time the peak temperature was reached.

The method 400 may further include receiving a save or restore request, at 412. The method 400 may further include determining whether the predicted temperature increase exceeds the specified maximum operating temperature, at 420. The measured temperature exceeding the specified maximum operating temperature may result in a thermal event. The predicted peak temperature may be based on a predicted temperature increase from an initial temperature. The initial temperature may be based on real-time measurements from a temperature sensor (e.g., the 224 or the temperature sensor 232 of FIG. 2 and/or the 324 or the temperature sensor 332 of FIG. 3) of the NVDIMM.

The method 400 may further include taking an action in response to determining that the projected temperature increase exceeds the specified maximum operating temperature, at 430. In some examples, the action may include performing an idle operation, at 432. In some examples, the action may include canceling the save or restore operation, at 434. In some examples, the action may include entering a warning or error in an error log, at 436. In some examples, the action may include any combination of performing an idle operation, canceling the save/restore operation, or entering a warning in an error log.

Performing an idle operation may include calculating an idle time and starting the idle operation. Once the idle operation has started, the method 400 may include determining whether the idle operation is supported by a current ramp rate, at 440. The current ramp rate may be based on a temperature change between two successive temperature measurements. The total length of the idle period of the save or restore operation may be based on a current temperature, the expected temperature increase, and the predicted recovery rate of temperature change. In some examples, the idle period may be bound by a specified time delay limit (e.g., based on a maximum amount of time the save or restore operation has complete). If the current rate does not support the idle operation, the method 400 may include canceling the save/restore operation, at 434 and/or entering a warning in the error log, at 436. If the current ramp rate does supports the idle operation, the method 400 may include completing the idle operation, at 442.

In response to taking the action, at 430, or in response to a determination that the projected temperature increase does not exceed the specified maximum operating temperature, the method 400 may include performing the save or restore operation, at 450. After completion of the save or restore operation, the method 400 may further include updating the temperature calibration, such as updating the predicted temperature increase according to the save or restore operation, updating the recovery ramp rate, etc., at 460.

Figure 5:
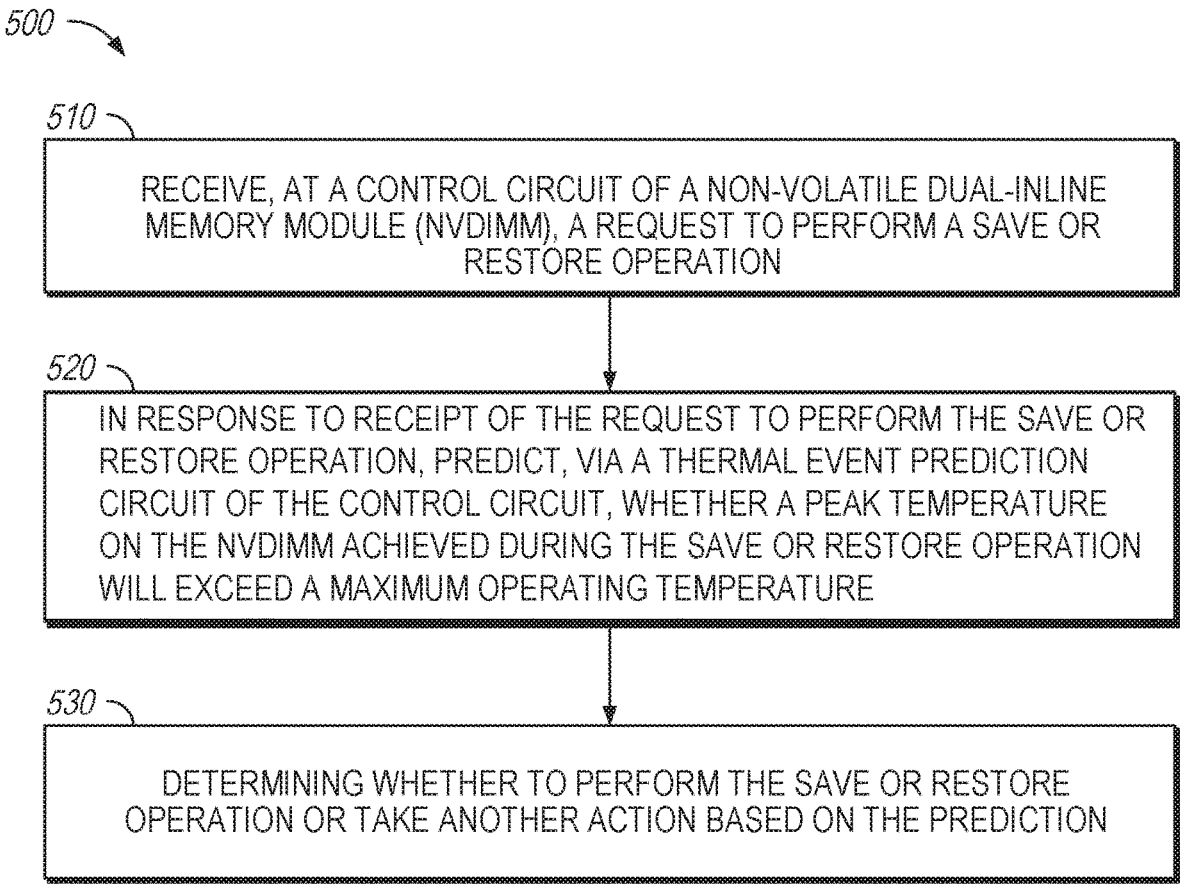
FIG. 5 includes an exemplary flowchart depicting a method for predicting a thermal event in a NVDIMM in accordance with an embodiment of the disclosure.

FIG. 5 includes an exemplary flowchart depicting a method 500 for predicting a thermal event in a NVDIMM in accordance with an embodiment of the disclosure. The method 500 may be performed by the NVDIMM 110 of FIG. 1, the temperature sensor 222 of FIG. 2, the temperature sensor 322 of FIG. 3, or a combination thereof. To predict the thermal event, a temperature event predictor may predict a peak temperature based on a predicted temperature increase from a starting temperature and a time duration to complete the save or restore operation, which may be based on an amount of data to transfer and the data throughput of the relevant buses.

The method 500 may include receiving, at a control circuit of a non-volatile dual-inline memory module (NVDIMM), a request to perform a save or restore operation, at 510. The NVDIMM may include the NVDIMM 110 of FIG. 1, the NVDIMM 200 of FIG. 2, the NVDIMM 300 of FIG. 3, or any combination thereof. The control circuit may include the controller 112 of FIG. 1, the controller 220 of FIG. 2, the controller 320 of FIG. 3, or any combination thereof. The save or restore operation may include transferring data from a volatile memory to a non-volatile memory of the NVDIMM.

The method 500 may further include, in response to receipt of the request to perform the save or restore operation, predicting, via a thermal event prediction circuit of the control circuit, whether a peak temperature on the NVDIMM achieved during the save or restore operation will exceed a maximum operating temperature, at 520. The thermal event prediction circuit may include a thermal event prediction circuit of the controller 112 of FIG. 1, the temperature sensor 222 of FIG. 2, the temperature sensor 322 of FIG. 3, or any combination thereof. In some examples, the method 500 may further include predicting the peak temperature based on a current temperature and a predicted temperature increase. In some examples, the method 500 may further include determining the predicted temperature increase during a calibration operation performed during a boot of the NVDIMM. In some examples, the method 500 may further include selecting a first value for the predicted temperature increase in response to the save or restore operation being a full save or restore operation, and selecting a second value for the predicted temperature increase in response to the save or restore operation being a partial save or restore operation.

The method 500 may further include determining whether to perform the save or restore operation or take another action based on the prediction, at 530. In some examples, the method 500 may further include, in response to a prediction that the peak temperature will exceed the maximum operating temperature, canceling the save or restore operation, generating an entry in an error log, delaying a start of the save or restore operation for an idle period, or any combination thereof.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

What is claimed is:

1. An apparatus, comprising:
a volatile memory;
a non-volatile memory (NVM) coupled with the volatile memory;
a control circuit coupled between the NVM and the volatile memory; and
a temperature sensor coupled to the control circuit and configured to provide a current temperature of the control circuit,
wherein the control circuit is configured to, in response to receipt of a command to perform a data transfer operation between the volatile memory and the NVM, predict whether the data transfer operation will cause a temperature of the control circuit to exceed a specified maximum operating temperature based on a predicted temperature increase for the data transfer operation, and
wherein the control circuit is configured to, during a boot operation, measure a temperature increase during a test data transfer operation to determine the predicted temperature increase.

2. The apparatus of claim 1, wherein the control circuit is configured to predict whether the data transfer operation will cause the temperature of the control circuit to exceed the specified maximum operating temperature based on the current temperature.

3. An apparatus comprising:
a volatile memory;
a non-volatile memory (NVM) coupled with the volatile memory;
a temperature sensor; and
a control circuit coupled between the NVM and the volatile memory and coupled to the temperature sensor, wherein the control circuit is configured to, in response to receipt of a command to perform a data transfer operation between the volatile memory and the NVM, predict whether the data transfer operation will cause a temperature of the control circuit to exceed a specified maximum operating temperature,
wherein the control circuit is configured to cancel the data transfer operation in response to a determination that the data transfer operation will cause the temperature of the control circuit to exceed the specified maximum operating temperature.

4. An apparatus comprising:
a volatile memory;
a non-volatile memory (NVM) coupled with the volatile memory;
a temperature sensor; and
a control circuit coupled between the NVM and the volatile memory and coupled to the temperature sensor, wherein the control circuit is configured to, in response to receipt of a command to perform a data transfer operation between the volatile memory and the NVM, predict whether the data transfer operation will cause a temperature of the control circuit to exceed a specified maximum operating temperature,
wherein the control circuit is configured to generate an entry in an error log in response to a determination that the data transfer operation will cause the temperature of the control circuit to exceed the specified maximum operating temperature.

5. An apparatus comprising:
a volatile memory;
a non-volatile memory (NVM) coupled with the volatile memory;

a temperature sensor; and
a control circuit coupled between the NVM and the volatile memory and coupled to the temperature sensor, wherein the control circuit is configured to, in response to receipt of a command to perform a data transfer operation between the volatile memory and the NVM, predict whether the data transfer operation will cause a temperature of the control circuit to exceed a specified maximum operating temperature,
wherein the control circuit is configured to initiate an idle period to delay a start of the data transfer operation for a time period to allow the current temperature to decrease in response to a determination that the data transfer operation will cause the temperature of the control circuit to exceed the specified maximum operating temperature.

6. The apparatus of claim 5, wherein the control circuit is configured to determine whether a length of the idle period necessary to allow the current temperature to decrease to a target temperature to avoid the temperature exceeding the specified maximum temperature period exceeds a maximum idle time period.

7. The apparatus of claim 6, wherein the control circuit is configured to determine the length of the idle period necessary to allow the current temperature to decrease to the target temperature based on a current temperature decrease rate.

8. The apparatus of claim 1, wherein the volatile memory or the NVM comprises the temperature sensor.

9. The apparatus of claim 1, wherein the temperature sensor comprises a discrete component separate from the volatile memory and the NVM.

10. An apparatus comprising:
a memory module comprising a synchronous, dynamic, random-access memory (SDRAM) coupled to a non-volatile memory (NVM) via a controller, wherein, in response to a request to initiate a save or restore operation to transfer data between the SDRAM and the NVM, the controller is configured to predict whether a current temperature will increase to exceed a maximum operating temperature during the save or restore operation based on a predicted temperature increase,
wherein the controller includes a thermal event prediction circuit configured to, prior to starting the save or restore operation, cause the controller to perform an action in response to a prediction that the current temperature will increase to exceed the maximum operating temperature,
wherein the thermal event prediction circuit is configured to cause the controller to initiate an idle period prior to starting the save or restore operation in response to a prediction that the current temperature will increase to exceed the maximum operating temperature.

11. An apparatus comprising:
a memory module comprising a synchronous, dynamic, random-access memory (SDRAM) coupled to a non-volatile memory (NVM) via a controller, wherein, in response to a request to initiate a save or restore operation to transfer data between the SDRAM and the NVM, the controller is configured to predict whether a current temperature will increase to exceed a maximum operating temperature during the save or restore operation based on a predicted temperature increase,
wherein the controller includes a thermal event prediction circuit configured to, prior to starting the save or restore operation, cause the controller to perform an action in response to a prediction that the current temperature will increase to exceed the maximum operating temperature,
wherein the thermal event prediction circuit is configured to perform a calibration operation to determine the predicted temperature increase.

12. The apparatus of claim 11, wherein the thermal event prediction circuit is configured to perform a test save and restore operation during the calibration operation and to measure a temperature difference between a starting temperature and a peak temperature to determine the predicted temperature increase.

13. The apparatus of claim 11, wherein the thermal event prediction circuit is configured to perform the calibration operation during a boot of the memory module.

14. A method, comprising:
receiving, at a control circuit of a non-volatile dual-inline memory module (NVDIMM), a first command for a save operation in which contents of a volatile memory of the NVDIMM is transferred to a non-volatile memory of the NVDIMM or a second command for a restore operation in which the contents of the non-volatile memory of the NVDIMM is written back to the volatile memory of the NVDIMM;
in response to the first command for the save operation or the second command for the restore operation, determining, via logic of the NVDIMM, whether a temperature on the NVDIMM during the save operation or the restore operation will exceed a threshold value associated with an operating temperature of the NVDIMM;
determining a peak temperature based on a current temperature and a predicted temperature increase to determine whether the temperature on the NVDIMM during the save operation or the restore operation will exceed the threshold value; and
determining whether to perform the save operation or the restore operation or take another action based at least in part on the determination of whether the temperature on the NVDIMM during the save operation or the restore operation will exceed the threshold value associated with the operating temperature of the NVDIMM.

15. The method of claim 14, further comprising determining the predicted temperature increase during a calibration operation performed during a boot of the NVDIMM.

16. The method of claim 14, further comprising:
selecting a first value for the predicted temperature increase in response to a save or restore operation being a full save or restore operation; and
selecting a second value for the predicted temperature increase in response to the save or restore operation being a partial save or restore operation.

17. A method, comprising:
receiving, at a control circuit of a non-volatile dual-inline memory module (NVDIMM), a first command for a save operation in which contents of a volatile memory of the NVDIMM is transferred to a non-volatile memory of the NVDIMM or a second command for a restore operation in which the contents of the non-volatile memory of the NVDIMM is written back to the volatile memory of the NVDIMM;
in response to the first command for the save operation or the second command for the restore operation, determining, via logic of the NVDIMM, whether a temperature on the NVDIMM during the save operation or the restore operation will exceed a threshold value associated with an operating temperature of the NVDIMM;

determining whether to perform the save operation or the restore operation or take another action based at least in part on the determination; and canceling the save operation or the restore operation in response to a determination that the temperature on the NVDIMM will exceed the threshold value.

18. A method, comprising:

receiving, at a control circuit of a non-volatile dual-inline memory module (NVDIMM), a first command for a save operation in which contents of a volatile memory of the NVDIMM is transferred to a non-volatile memory of the NVDIMM or a second command for a restore operation in which the contents of the non-volatile memory of the NVDIMM is written back to the volatile memory of the NVDIMM;

in response to the first command for the save operation or the second command for the restore operation, determining, via logic of the NVDIMM, whether a temperature on the NVDIMM during the save operation or the restore operation will exceed a threshold value associated with an operating temperature of the NVDIMM;

determining whether to perform the save operation or the restore operation or take another action based at least in part on the determination; and generating an entry in an error log in response to a determination that the temperature on the NVDIMM will exceed the threshold value.

19. A method, comprising:

receiving, at a control circuit of a non-volatile dual-inline memory module (NVDIMM), a first command for a save operation in which contents of a volatile memory of the NVDIMM is transferred to a non-volatile memory of the NVDIMM or a second command for a restore operation in which the contents of the non-volatile memory of the NVDIMM is written back to the volatile memory of the NVDIMM;

in response to the first command for the save operation or the second command for the restore operation, determining, via logic of the NVDIMM, whether a temperature on the NVDIMM during the save operation or the restore operation will exceed a threshold value associated with an operating temperature of the NVDIMM;

determining whether to perform the save operation or the restore operation or take another action based at least in part on the determination; and delaying a start of a save or restore operation for an idle period in response to a determination that the temperature will exceed the threshold value.

\* \* \* \* \*